(12) United States Patent
Burger

(10) Patent No.: US 8,662,130 B2
(45) Date of Patent: Mar. 4, 2014

(54) BAT FABRICATION SYSTEM AND METHOD

(75) Inventor: George Burger, Rocklin, CA (US)

(73) Assignee: Hillerich & Bradsby Co., Louisville, KY (US)

( * ) Notice: Subject to any disclaimer, the term of this patent is extended or adjusted under 35 U.S.C. 154(b) by 0 days.

(21) Appl. No.: 13/452,572

(22) Filed: Apr. 20, 2012

(65) Prior Publication Data

US 2013/0276962 A1    Oct. 24, 2013

(51) Int. Cl.
*B65H 81/00*    (2006.01)
(52) U.S. Cl.
USPC ............ 156/425; 156/173; 156/187; 156/432
(58) Field of Classification Search
USPC ......... 156/172, 173, 184, 185, 187–190, 195, 156/425, 428–432, 443, 446
See application file for complete search history.

(56) References Cited

U.S. PATENT DOCUMENTS

| 2,731,067 | A | * | 1/1956 | Miller | 156/190 |
| 4,202,718 | A | * | 5/1980 | Mizutani et al. | 156/171 |
| 5,048,441 | A | * | 9/1991 | Quigley | 114/90 |
| 2004/0188882 | A1 | * | 9/2004 | Matsumoto et al. | 264/257 |

* cited by examiner

*Primary Examiner* — Katarzyna Wyrozebski Lee
*Assistant Examiner* — Carson Gross
(74) *Attorney, Agent, or Firm* — Bingham Greenebaum Doll LLP; James C. Eaves, Jr.; Brian W. Chellgren

(57) ABSTRACT

A bat is created using efficient and automated techniques to apply layers of composite materials onto a mandrel. The system includes a plurality of rotating wrapping mechanisms binding stages. Each wrapping mechanism rotates along a central axis while a mandrel is driven through the axis. The rotational motion allows each wrapping mechanism to wrap one or more material strips along the outer surface of the mandrel. Between each wrapping layer, a binding material such as fusible thread may be applied to fuse wrapping layers together. The wrapping may be performed for the bat barrel and bat handle. Each mandrel may form two bats, and multiple mandrels can be connected together to maximize wrapping efficiency. The wrapped mandrels are separated into bat units, a resin transfer molding is performed, and the bats are completed.

12 Claims, 14 Drawing Sheets

BAT FABRICATION SYSTEM AND METHOD

BACKGROUND OF THE INVENTION

Baseball has a long history as an enjoyable sport in the United States. As players continue to try to break baseball records, baseball game strategy and equipment has evolved over time. One piece of baseball equipment that has seen major changes is the baseball bat.

The original baseball bats were built from wood. Eventually, other materials such as aluminum were used to replace wood baseball bats. Most recently, baseball bats have been made from fiberglass and graphite, or a combination of these materials and even aluminum, to form composite bats. Though the composite bats perform well, they can be expensive to manufacture.

The process of making a bat from graphite requires much human effort and work. Machines exist for cutting shaped pieces of graphite, placing them over a dowel or other object, and building a bat piece by piece from the graphite pieces. The process is slow and requires a significant amount of human effort.

There is a need in the art for an improved method for making bats from graphite or similar materials.

SUMMARY OF THE CLAIMED INVENTION

The present technology may be used to fabricate a bat using efficient and automated techniques to apply layers of composite materials onto a mandrel. The present system includes a plurality of rotating wrapping mechanisms binding stages. Each wrapping mechanism rotates along a central axis while a mandrel is driven through the axis. The rotational motion allows each wrapping mechanism to wrap one or more material strips along the outer surface of the mandrel. Between each wrapping layer, a binding material such as fusible thread may be applied to fuse wrapping layers together. The wrapping may be performed for the bat barrel and bat handle. Each mandrel may form two bats, and multiple mandrels can be connected together to maximize wrapping efficiency. The wrapped mandrels are separated into bat units, a resin transfer molding is performed, and the bats are completed.

In an embodiment, a the present technology may be used to fabricate a bat. A mandrel may be received by a bat fabrication system. The mandrel may then be automatically be wrapped with at least two strips of material applied by a rotating wrapping mechanism within the bat fabrication system.

In an embodiment, the bat fabrication system of the present technology may include a mandrel driving system and a plurality of rotating wrapping mechanisms. The plurality of rotating wrapping mechanisms may automatically wrap strips of material around a first mandrel driven by the first mandrel driving mechanism.

DETAILED DESCRIPTION

The present technology provides an efficient way to create a bat using automated techniques to apply layers of composite materials into a bat shape. An automated assembly-line perform most of the work in fabricating the bats. The system includes a plurality of rotating wrapping mechanisms and a device for applying a binder between wrapped layers. Each wrapping mechanism rotates along a central axis while a mandrel is driven through the axis. The rotational motion allows each wrapping mechanism to wrap one or more composite material strips along the outer surface of the mandrel. The mandrel travels through a plurality of the wrapping mechanisms to receive multiple layers of wrapping. Between each wrapping layer, a binding material such as fusible thread may be applied between each layer. The binding material may keep the wrapping layers fused together.

The mandrel may be shaped as two bat barrels connected at the barrel tip. Hence, the mandrel represents two bats that are positioned with their barrel ends facing each other. The mandrels may be connected together through the wrapping process using a bushing or other device positioned at the opposite end of the barrel. Once the wrapping of the barrels is complete, consecutive wrapped mandrels may be separated at the point of the bushing. The mandrels may then be fitted with a rod or other item in the shape of a handle, and re-fed through the series of wrapping mechanisms and binding steps. The mandrels receiving handle wrapping may be connected together through the series of wrapping mechanisms using a coupling. The mandrels may then be removed from the bat fabrication machine, separated at the coupling, and cut in half at the center mandrel. As a result, each mandrel may produce two bats. The separated mandrel portions undergo resin transfer molding, the resin is cured, the mandrel is removed, and the bat structure is completed with a cap, knob and painting.

In some embodiments, the bat handle and barrel may be made separately rather than from the same mandrel. In this embodiment, the bat handle and barrel may be connected together after the separate pieces are made. Though some discussions herein reference a mandrel for both the handle and barrel, the scope of the present invention is intended to include embodiments wherein a bat handle and barrel are formed from separate mandrels and connected together.

Figure 1:
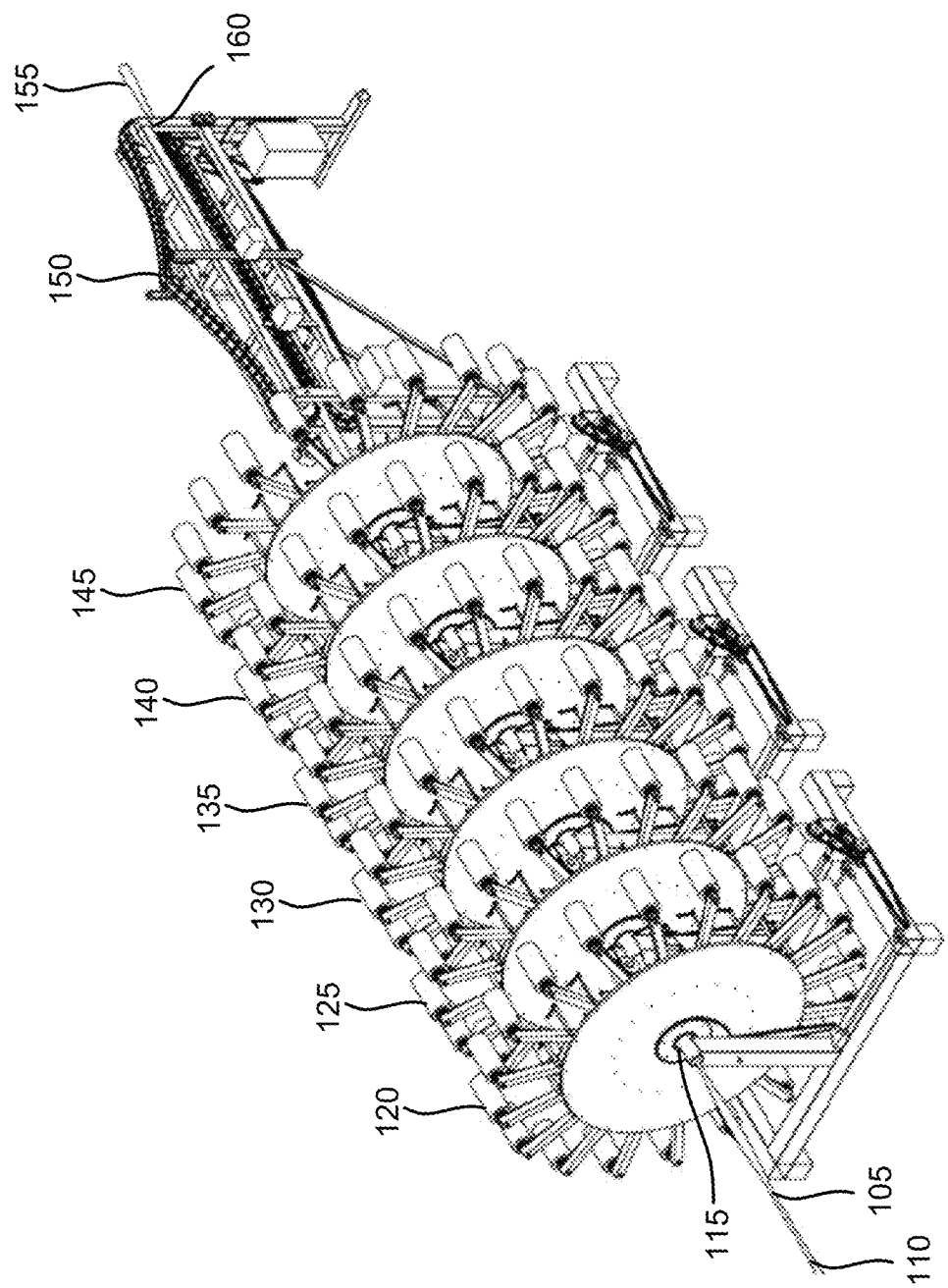
FIG. 1 illustrates a perspective view of an exemplary bat fabrication system.

FIG. 1 illustrates a perspective view of an exemplary bat fabrication system. The bat fabrication system of FIG. 1 includes a plurality of wrapping mechanisms 120, 125, 130, 135, 140 and 145. A first mandrel 105 is received by the first wrapping mechanism 120 at input port 115. The received mandrel is wrapped by each of wrapping mechanisms 120-145. A second mandrel 110 may be connected to first mandrel 110. The series of interconnected mandrels may be driven through series of wrapping mechanisms 120-145 by mandrel driving mechanism 150. A wrapped mandrel 155 is eventually output at output port 160.

Each wrapping mechanism may wrap a mandrel in a material suitable for fabrication and/or construction of a bat. A suitable material for forming a bat may include graphite, fiberglass, or some other material. The material may be applied to the mandrel from each wrapping mechanism as each wrapping mechanism rotates along a center axis. The mandrel travels along the center axis through each wrapping mechanism and is wrapped by one or more threads of wrapping material by each wrapping mechanism.

In some embodiments, the wrapping mechanisms may rotate in different directions. For example, wrapping mechanisms 120, 130, and 140 may rotate in a clockwise direction while wrapping mechanisms 125, 135, and 145 may rotate in a counter-clockwise direction. The alternating direction of the resulting weave may provide for a better constructed bat.

After a mandrel is wrapped by wrapping mechanism 145, the mandrel may be engaged by mandrel driving mechanism 150. Mandrel driving mechanism 150 may engage the wrapped mandrel by securing a hold on the mandrel and pulling the mandrel and any mandrels connected thereto. As a result, subsequent mandrels connected to the mandrel engaged by the mandrel driving mechanism are driven through the wrapping mechanisms automatically. Mandrel driving mechanism 150 outputs a string of connected wrapped mandrel 155 at output port 160.

Figure 2:
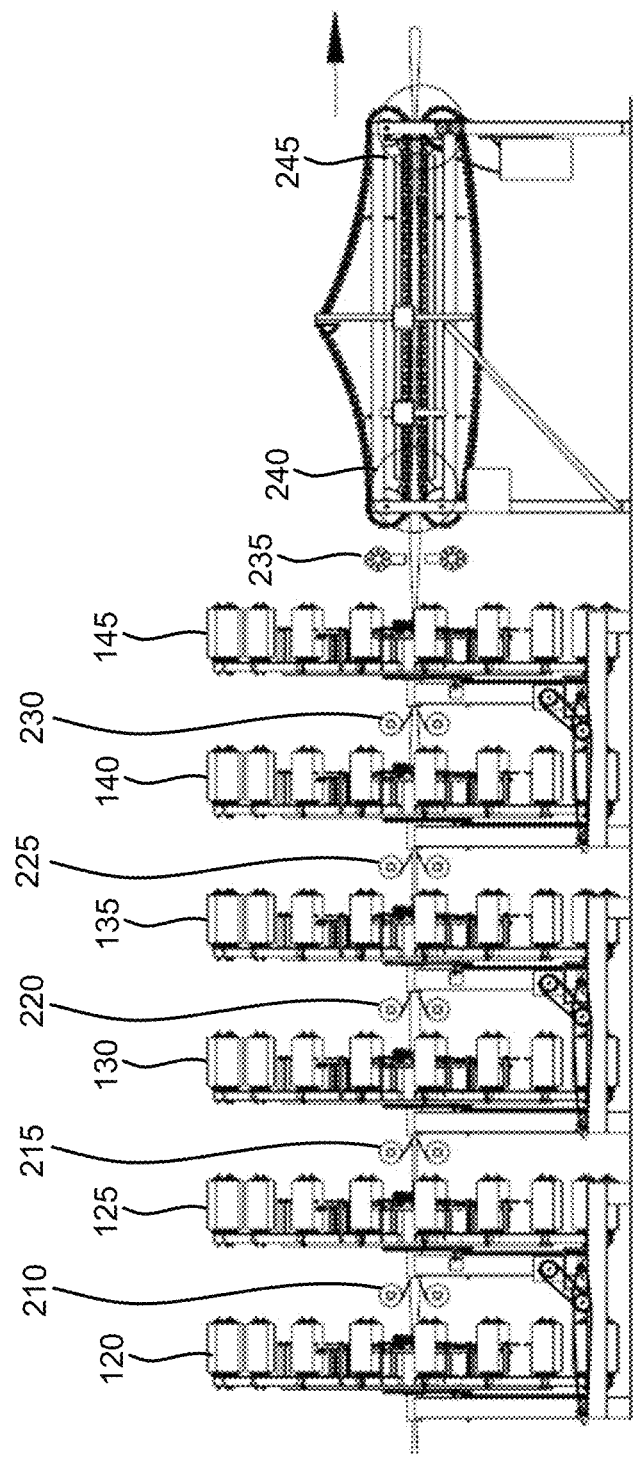
FIG. 2 illustrates a side view of a bat fabrication system.

FIG. 2 illustrates a side view of an exemplary bat fabrication system. The bat fabrication system of FIG. 2 includes wrapping mechanisms 120-145 as shown in FIG. 1. Between the wrapping mechanisms are binder dispensers 210, 215, 220, 225, and 230. Each binder dispenser is positioned between two wrapping mechanisms, for example binding dispenser 220 is positioned between wrapping mechanism 130 and 135. The binding dispensers may each dispense a binding material onto the wrapped mandrel which is output from the immediately preceding wrapping mechanism.

The binding material may help bind adjacent layers of wrapping material on the mandrel. For example, the binding dispenser may attach a fusible thread to each wrapping layer applied to a mandrel. A heating member 235 may be used to melt the fusible thread between the adjacent wrapping layers and fuse the layers together. Heating member 235 may be located immediately after each binder dispenser (e.g., between binder dispenser 220 and wrapping mechanism 135) or after two or more binder dispensers, such as the illustrated location of heating member 235. The driving system located after heating member 235 may pull one or more mandrels through bat fabrication system. Mandrel driving system may include a mandrel driving system feeding end 240 and mandrel driving system output end 245 (discussed in more detail below with respect to FIGS. 7A-B).

Figure 3:
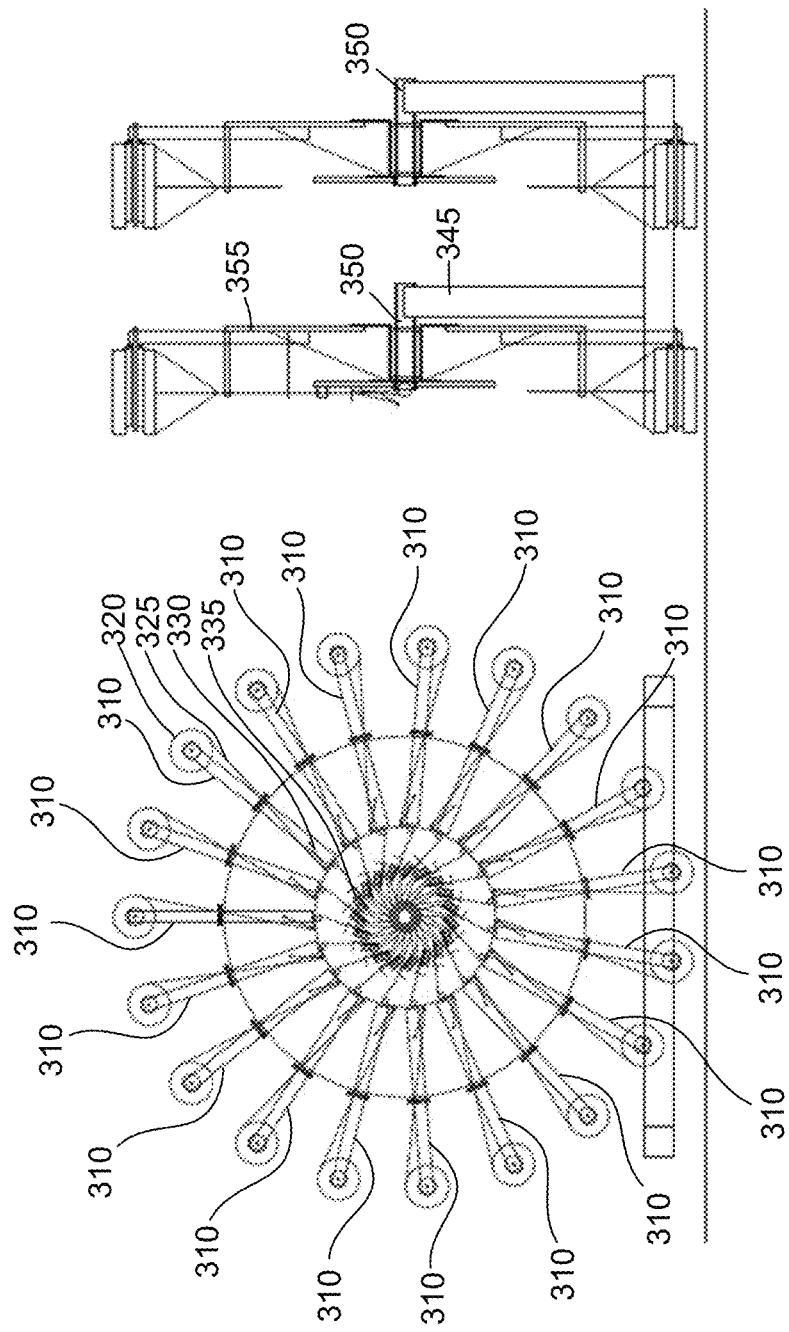
FIG. 3A illustrates a front view of an exemplary wrapping mechanism.
FIG. 3B illustrates a side view of an exemplary wrapping mechanism.

FIG. 3A illustrate a front view of an exemplary wrapping mechanism. The front view of the wrapping mechanism of FIG. 3A illustrates a number of toes 310 extending away from the center of the wrapping mechanism. Each toe 310 includes a wrapping material roll 320 at the end of a toe 310. Wrapping material 325 may extend from wrapping material roll 320 towards the center of the wrapping mechanism to be wrapped onto a mandrel. The mandrel is fed through the center of the wrapping mechanism (the mandrel would emerge from the mandrel tunnel in the wrapping mechanism outward from the page). A tension spring 330 may be used to maintain a desired tension in the wrapping material while the wrapping material roll decreases in size as material is used. A guide 335 positions the wrapping material to be wrapped around a mandrel as wrapping mechanism rotates and the mandrel travels through the mandrel tunnel in the center of the wrapping mechanism.

The number of toes used in a wrapping mechanism may vary. The wrapping mechanism of FIG. 3A includes nineteen toes. In some embodiments, the number of toes and corresponding number of threads to be wrapped onto a mandrel may depend on the thickness of the bat to be formed, the material which will wrapped around the mandrel, and other factors. For example, the thickness of fiber glass is less than a quarter of the thickness of graphite, so more layers of fiberglass would be required to form a desired thickness in bat material than the corresponding layers of graphite.

Figure 4:
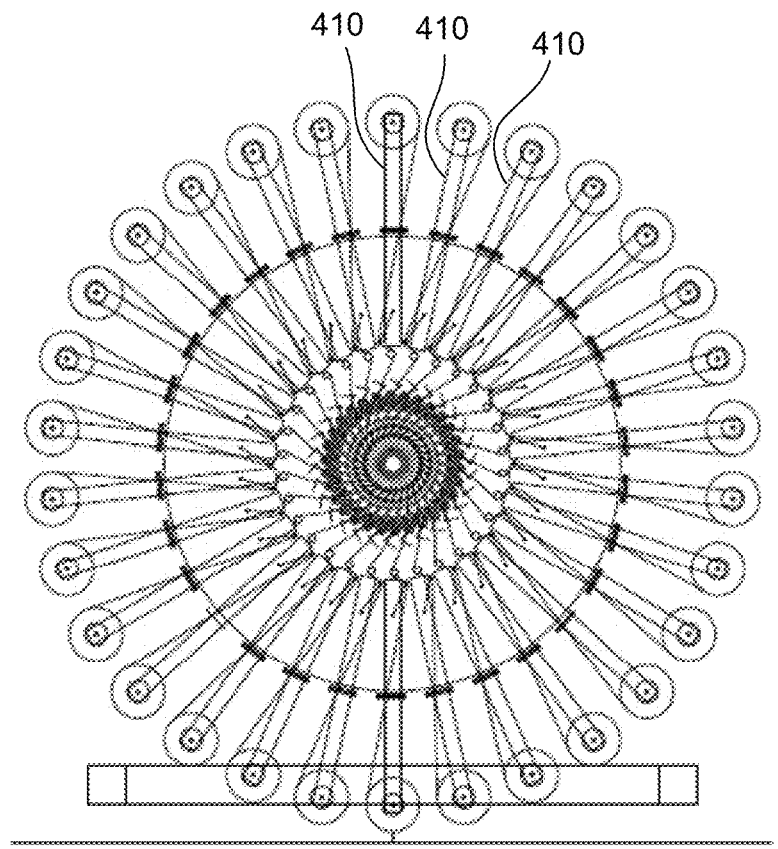
FIG. 4 illustrates a side view of another exemplary wrapping mechanism.

FIG. 3B illustrates a side view of an exemplary wrapping mechanism. The wrapping mechanism of FIG. 3B illustrates a side view of a toe at the top of the mechanism and a toe at the bottom of the mechanism for purposes of simplicity and illustration—additional toes will likely be present in working embodiments, but are not illustrated in FIG. 3B. The wrapping mechanism is maintained in an upright position by support member 345. Support member 345 is attached to a wrapping mechanism to keep it in an desired (i.e., upright) position. Support member 345 does not rotate with a wrapping mechanism. A mandrel tunnel 350 is connected to the support member as well as a backboard 355. The toes themselves (toes 310 in FIG. 3A) are attached to backboard 355. As shown in FIG. 3B, mandrel tunnels 350 located within multiple wrapping mechanisms may be horizontally and vertically aligned so that a mandrel passing through one mandrel tunnel is aligned to fit through subsequent mandrel tunnels in a series of wrapping mechanisms FIG. 4 illustrates a side view of another exemplary wrapping mechanism. The wrapping mechanism of FIG. 4 is similar to that of FIG. 3A except that the wrapping mechanism of FIG. 4 includes thirty toes 410. As indicated above, the number of toes incorporated into a wrapping mechanism may be adjusted based on the desired thickness and flexibility of a bat, material used, and other factors.

Figure 5A:
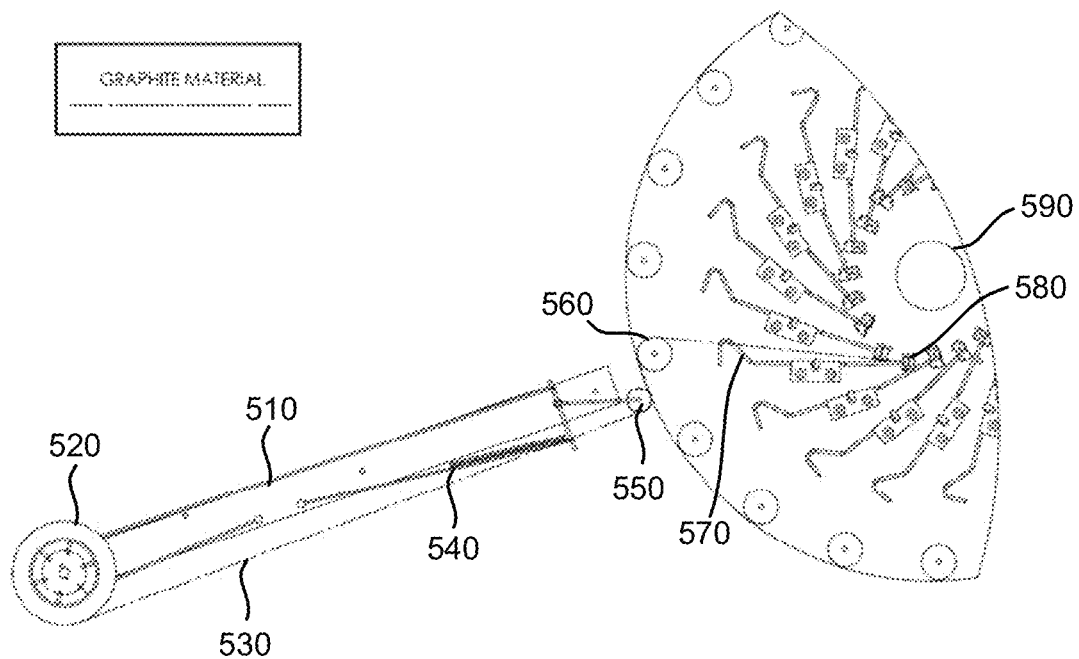
FIG. 5A illustrates a side view of an exemplary toe.

FIG. 5A illustrates a side view of an exemplary toe. The toe 510 of FIG. 5A includes wrapping material roll 520, wrapping material 530, tension spring 540, first pulley 550, and second pulley 560. The wrapping material roll is attached to the end of toe 510. The wrapping material unwraps from the roll and is engaged around first pulley 550. The position of first pulley 550 is determined by tension spring 540, which maintains a desired tension in the wrap material as the wrap material roll 520 size decreases while being used up. Wrapping material 530 wraps around first pulley 550 and over second pulley 560 and then travels through guide 570. The wrapping material is then fed through a director 580 and then around a mandrel. As the mandrel is driven through mandrel tunnel 590, the wrapping material extending from director 580 wraps around the circumference of the mandrel as wrapping mechanism rotates about the tunnel and mechanism center axis.

Figure 5B:
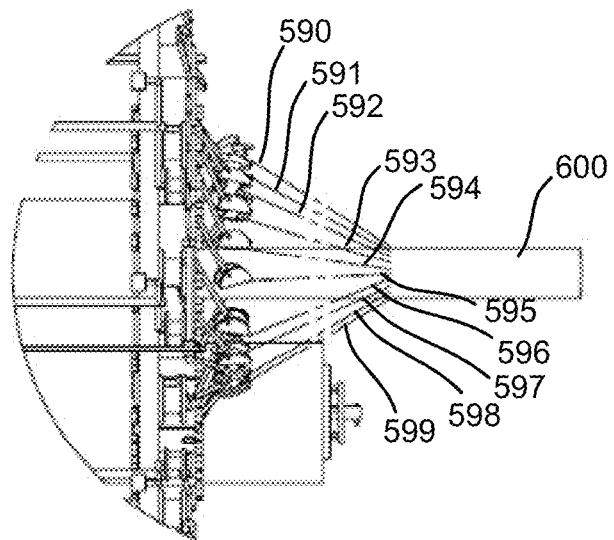
FIG. 5B illustrates a side view of a mandrel exiting a wrapping mechanism.

FIG. 5B illustrates a side view of a mandrel exiting a wrapping mechanism with a plurality of toes. As illustrated in FIG. 5B, a wrapping mechanism having a plurality of toes will apply the plurality of wrapping material threads to a mandrel 600 as the mandrel is pulled through the bat fabrication system. The wrapping material threads 590-599 are wrapped in a threaded manner around the surface of the mandrel as the mandrel is driven through the mandrel tunnel and the wrapping mechanism rotates about the mandrel tunnel.

Figure 6B:
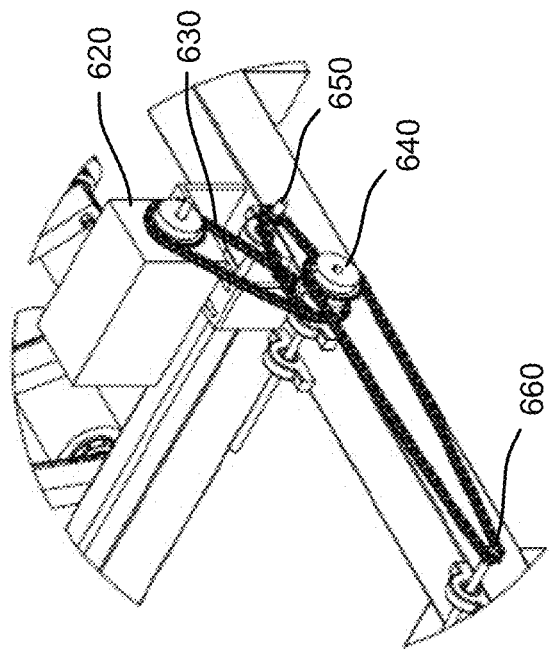
FIG. 6B illustrates a perspective view of an exemplary wrapping mechanism driving system.
Figure 6A:
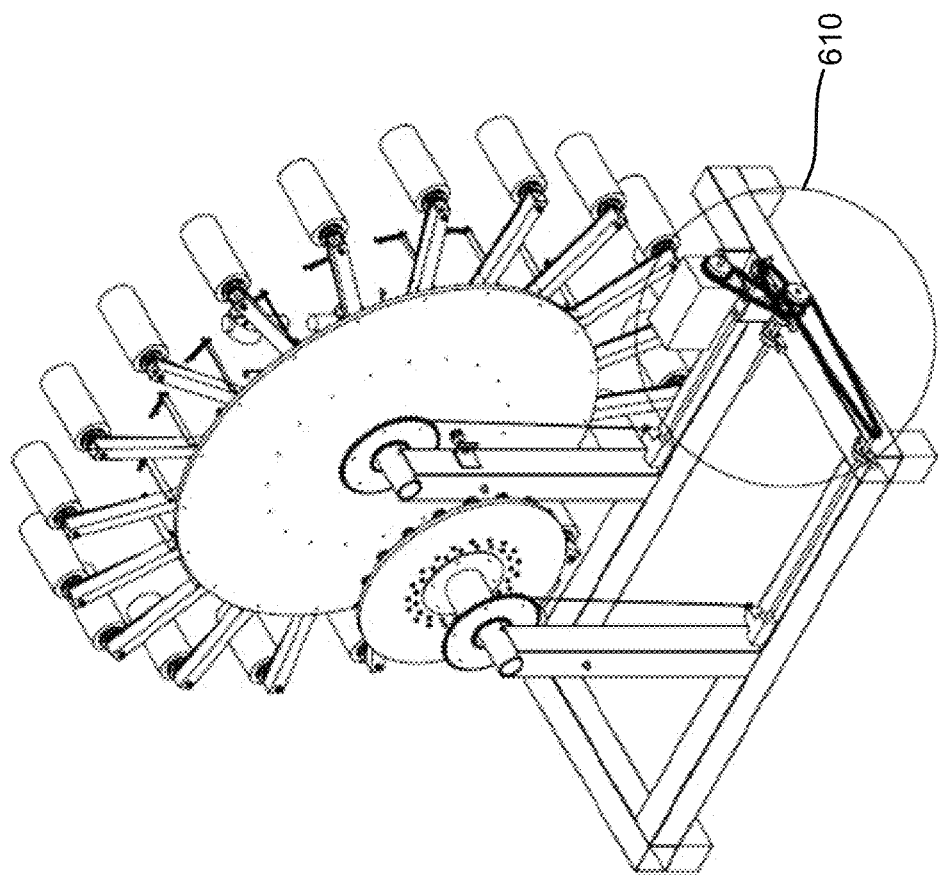
FIG. 6A illustrates a perspective view of an exemplary wrapping mechanism.

FIG. 6A illustrates a perspective view of an exemplary wrapping mechanism. The wrapping mechanism of FIG. 6A is driven in a rotational direction by wrapping mechanism driving system 610. Driving system 610 drives various gears to cause the wrapping mechanism to move in a rotational manner at a desired speed. FIG. 6B illustrates a perspective view of an exemplary wrapping mechanism driving system. The driving system of FIG. 6B includes motor 620, first chain 630, drive gear 640, wrap mechanism gear 650, and gear 660. As motor 620 drives the first chain 630, drive gear 640 which is also attached to the first chain 630 drives the wrapping mechanism gear 650 and gear 660 at desired speeds in order to induce rotation in the wrapping mechanism. A plurality of wrapping mechanism driving systems may be used to drive alternating wrapping mechanisms in clockwise and counter-clockwise directions.

Figure 7B:
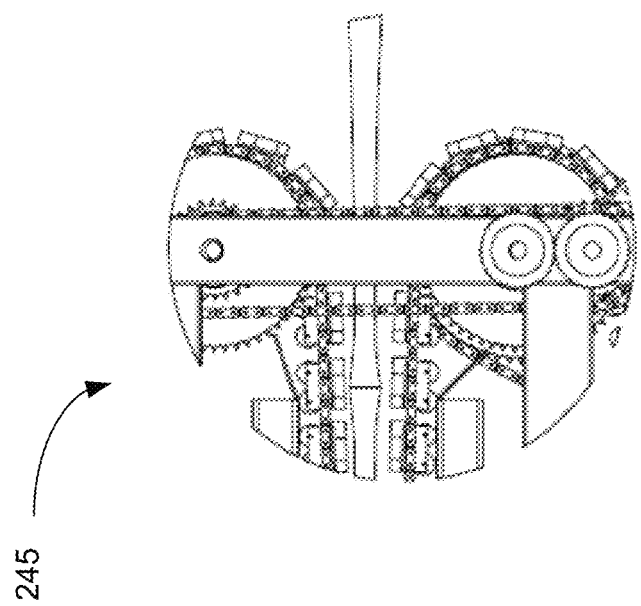
FIG. 7B illustrates a side view of an output end of a mandrel driving system.
Figure 7A:
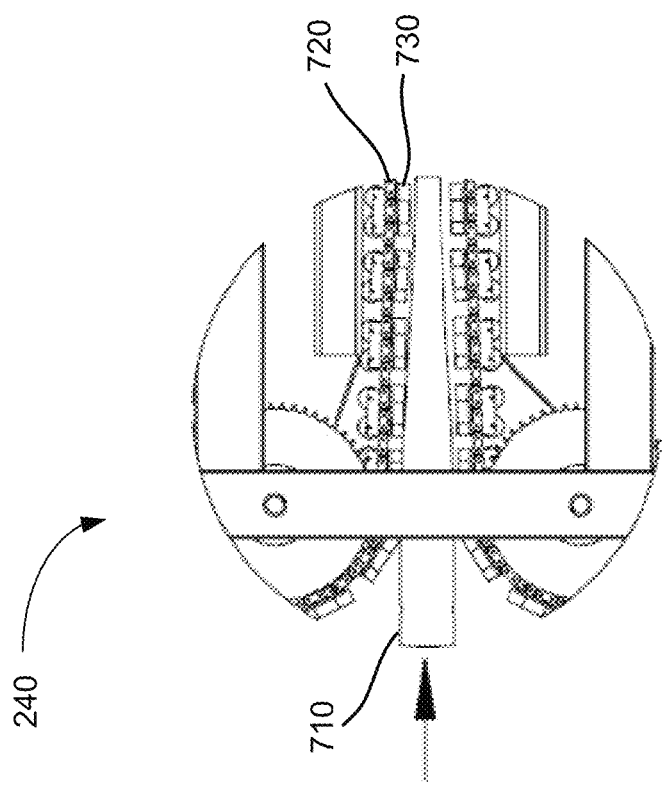
FIG. 7A illustrates a side view of a feeding end of a mandrel driving system.

FIG. 7A illustrates a side view of a feeding end of a mandrel driving system. Once mandrels have traveled through the wrapping mechanisms, binder dispensers, and heating members, the mandrels may be received by a mandrel driving system. Once received by the mandrel driving system, the system pulls the train of mandrels through the entire bat fabrication system. FIG. 7B illustrates a side view of an output end of a mandrel driving system. Both the feeding end and output end of the mandrel driving system include a driving chain and clamping members. The driving chain is driven by a motor and positions the clamping members to apply a force to the mandrels and pull the mandrels through the system. In some embodiments, the clamping members only engage the thickest portion of the wrapped mandrel—the portion forming the bat barrel. The mandrels are eventually output through the output end of the mandrel driving system.

Figure 8A:
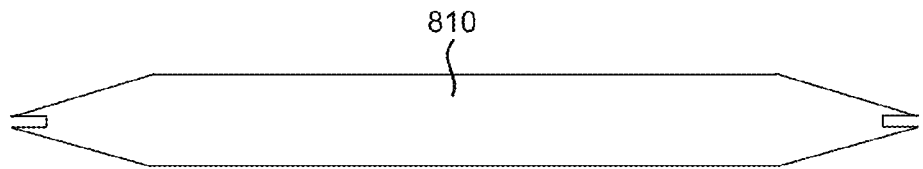
FIG. 8A illustrates a side view of an exemplary mandrel.
Figure 8B:
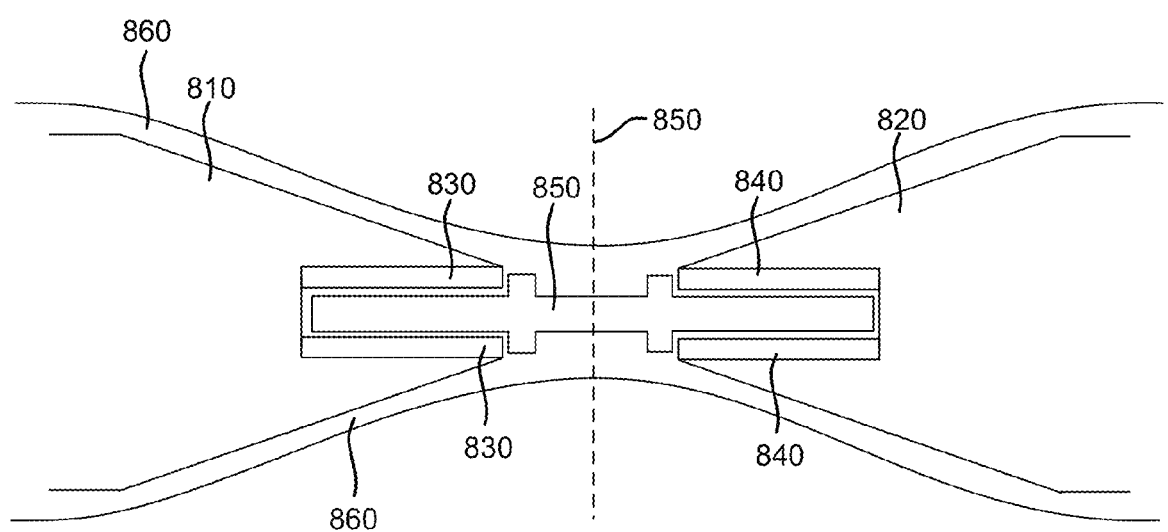
FIG. 8B illustrates a side view of a portion of a pair of connected mandrels for forming bat barrels.

FIG. 8A illustrates a side view of an exemplary mandrel. The exemplary mandrel 810 may be shaped to resemble two baseball bat barrels that are positioned with the barrel ends facing each other and have tapered ends. FIG. 8B illustrates a side view of a portion of a pair of connected mandrels for forming bat barrels. A first mandrel 810 and second mandrel 820 may be formed from wax. The wax may be poured in a mold in the shape of two bat barrels positioned with their barrels adjacent to each other, the wax sets, and the resulting wax mold is used as the mandrel. Hence, the mandrel represents two bats that are positioned with their barrel ends facing each other.

Each mandrel may have layers of wrappings 860 formed over the outer surface of the mandrels and may include inserts 830 and 840 inserted into the tip of the mandrels opposite the barrel end (i.e., the outer ends of the mandrels). A bushing 850 may be used to connect sequential mandrels together as the mandrels are fed into the series of wrapping mechanisms. The inserts may act to receive the bushing and help connect the mandrels while protecting the tapered edges of the mandrels 810 and 820. The bushing connects the mandrels as they are pulled through the bat fabrication system by the mandrel driving system. The bushing 850 may be formed from plastic and inserts 830 and 840 may be formed from aluminum.

Figure 9A:
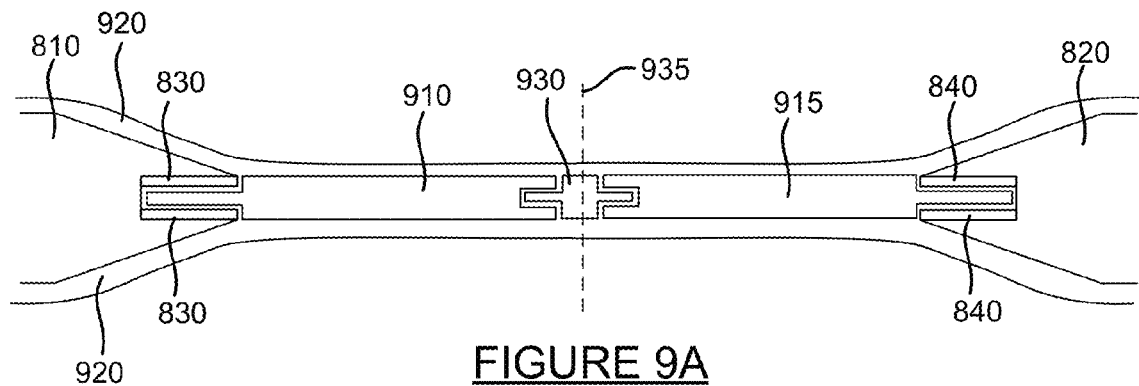
FIG. 9A illustrates a side view of a portion of connected mandrels for forming bat handles.

FIG. 9A illustrates a side view of a portion of connected mandrels for forming bat handles. A first mandrel 810 and second mandrel 820 each include a slot such as the slot formed by inserts 830 and 840 in the mandrels of FIG. 8. A first rod 910 is placed into the slot of the first mandrel 810 and a second rod 915 is placed into the slot of the second mandrel 820. A coupling 930 is used to connect the rods 910 and 920 together. Rod 910 has pins on each end, with a first pin being received by mandrel 810 and the second pin being received by a receiving end of coupling 930. Rod 915 also has two pins, a first pine being received by second mandrel 820 and the other pin received by the other end of coupling 930.

Figure 9B:
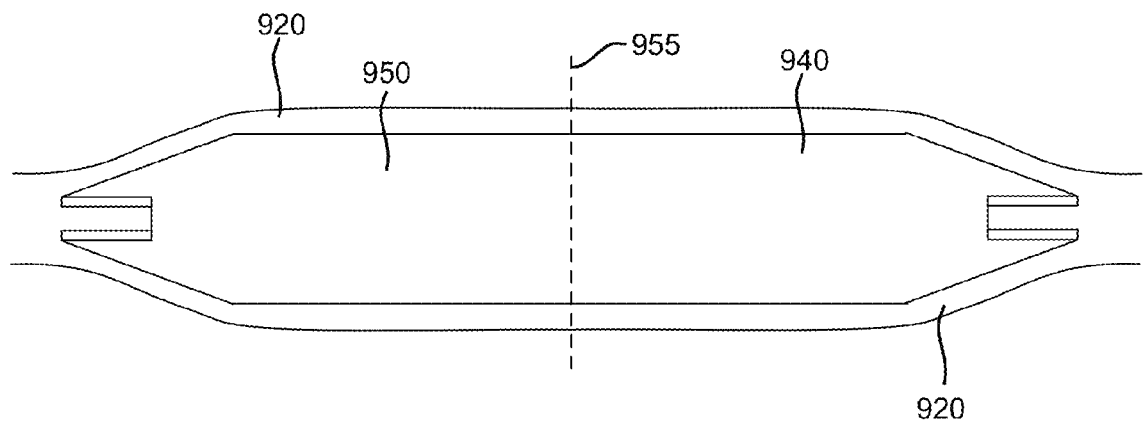
FIG. 9B illustrates a side view of an exemplary wrapped mandrel.

For example, a first wrapped mandrel and rod may be fed barrel first into a mandrel tunnel of a first of several wrapping mechanisms, and a second wrapped mandrel and rod may be connected to the first mandrel using the coupling 930. The second connected wrapped mandrel and rod would then be fed through the mandrel tunnel immediately behind the first wrapped mandrel and rod. The two mandrels, two rods and coupling may be fed into the mandrel tunnel of the first wrapping mechanism to apply layer wrappings 920 over the entire set of connected mandrels. After the mandrels are output by the mandrel driving system at the end of bat fabrication system, the mandrels may be separated into individual bat elements. First, the mandrels would be separated at the coupling (see line 935 of FIG. 9A), which would result in a series of individually wrapped mandrels and wrapped rods. Second, the individual mandrels would be split in half to separate each rod with a corresponding barrel (half of the mandrel). See line 955 at FIG. 9B. The resulting half-mandrels form the barrel portion of the bat and the wrapped rods form the handle portion of the bat.

Figure 10:
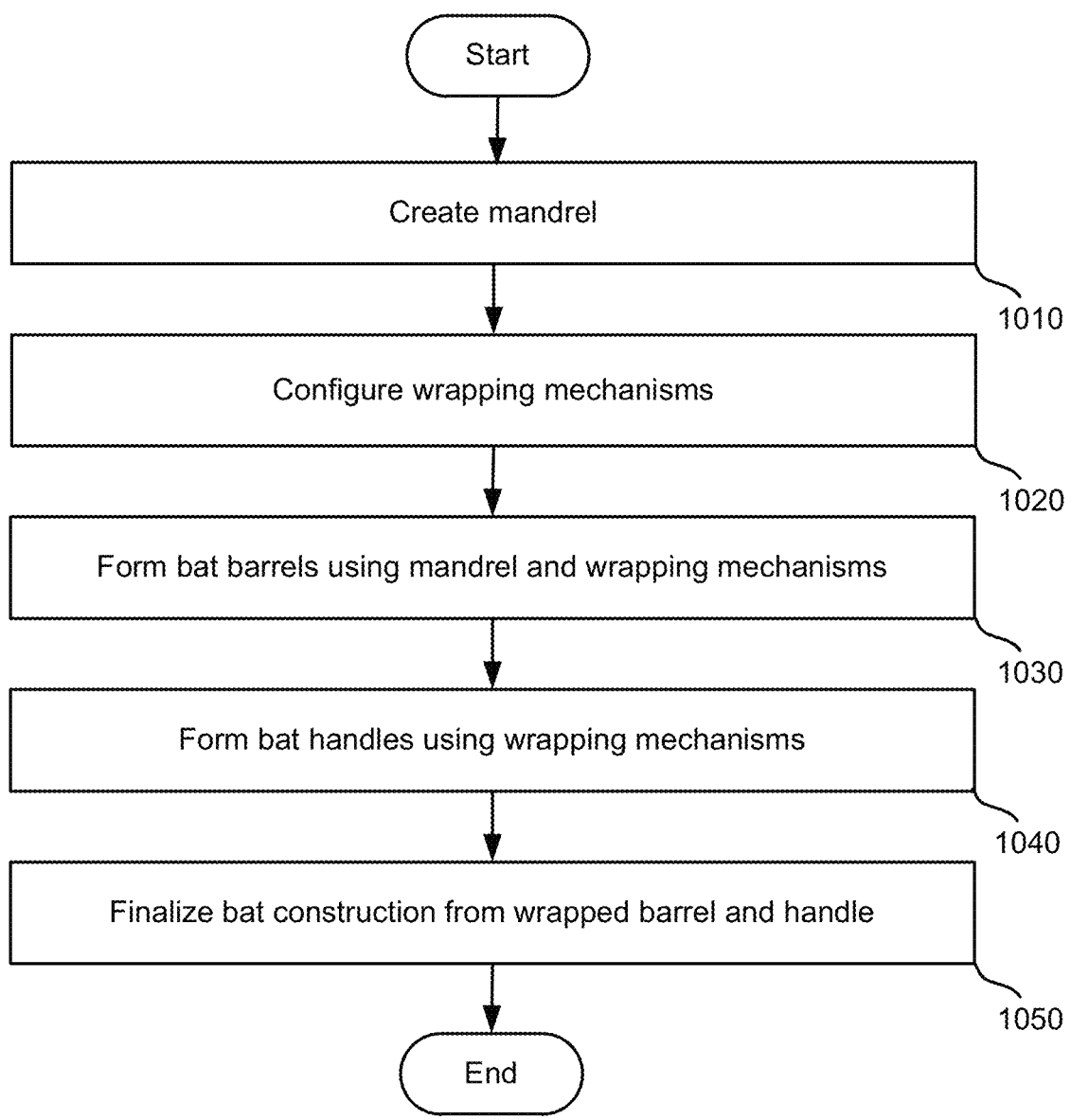
FIG. 10 illustrates an exemplary method for constructing a bat.

FIG. 10 illustrates an exemplary method for constructing a bat. First, a mandrel is created at step 1010. The mandrel may be created using a wax mold. In some embodiments, the mandrel is formed as two bat barrels aligned together which are connected at the barrel end and tapered at the outer ends (towards the handle end). Wrapping mechanisms of a bat fabrication machine are configured at step 1010. The wrapping mechanisms may be configured with a desired number of toes, a type of wrapping material, and a speed in which they will rotate. Different wrapping mechanisms need not be configured identically within a bat fabrication machine. For example, a wrapping mechanism configuration may include sixteen toes and material including 24K graphite. The resulting wrapping mechanisms may then be rotated at a speed that moves the mandrel at about one foot per minute. A range of toes used in a wrapping mechanism may vary from 8 to 32 toes. Another range of toes may vary from 12 to 20 toes.

Bat barrels are formed using the created mandrel and the configured wrapping mechanisms at step 1030. Forming the bat barrels may include feeding one or more mandrels into the wrapping mechanisms and wrapping the mandrels with multiple layers of wrapping material. Forming bat barrels using a mandrel and wrapping mechanisms is discussed in more detail below with respect to FIG. 11. Bat handles may then be formed using a mandrel and wrapping mechanisms at step 1040. Forming bat handles may include adding a rod to the mandrel and wrapping material over the rod and the pre-wrapped mandrels. Forming bat handles is discussed in more detail below with respect to the method of FIG. 13. Bat construction is finalized from the wrapped barrel and handle at step 1050. Finalizing the bat construction may include separating the mandrels into wrapped barrel and handle units, applying a resin and curing the resin, and adding other components to the bat. Finalizing bat construction is discussed in more detail below with respect to FIG. 14.

Figure 11:
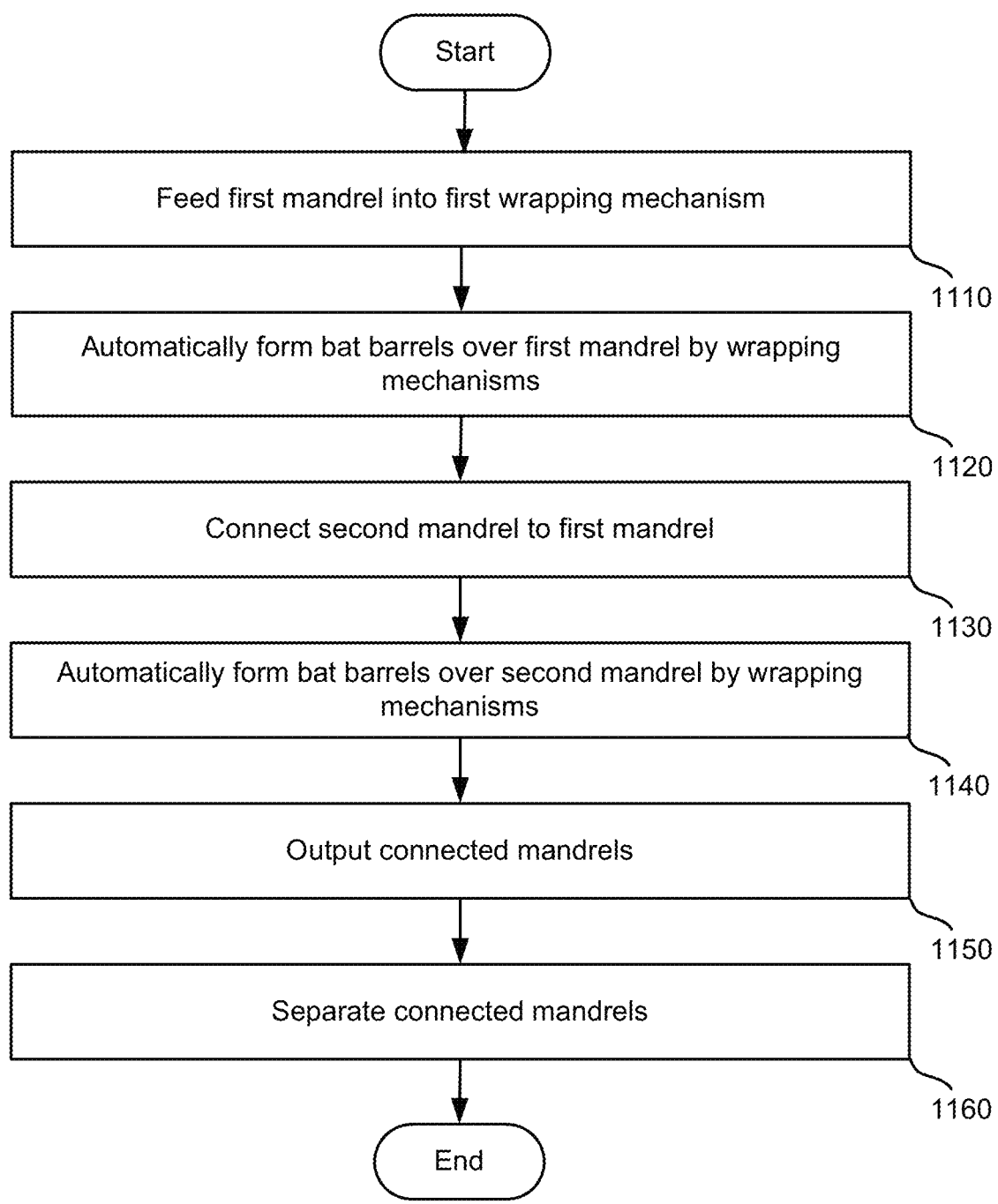
FIG. 11 illustrates an exemplary for forming bat barrels.

FIG. 11 illustrates an exemplary method for forming bat barrels. The method of FIG. 11 provides more detail for step 1030 of the method of FIG. 10. A first mandrel is fed into a first wrapping mechanism at step 1110. The first mandrel may be inserted into the mandrel tunnel of the first wrapping mechanism and fed by hand until the mandrel is received by a mandrel driving system within the bat fabrication system. Bat barrels are automatically formed over the first mandrel by wrapping mechanisms at step 1120. Automatically forming the bat barrels may include applying a weave of material over the mandrel by rotating wrapping mechanisms over the mandrel driven through a plurality of wrapping mechanisms. Automatically forming bat barrels over the first mandrel by wrapping mechanisms is discussed in more detail below with respect to the method of FIG. 12.

A second mandrel may be connected to the first mandrel at step 1130. In some embodiments, each mandrel may include a slot a the outer ends (non-barrel ends) for receiving a bushing or coupling. The slot may be reinforced by inserts such as aluminum inserts. The bushing may connect an end of a first mandrel to an end of a second mandrel. The second mandrel may be connected to the first mandrel using the bushing, which may be inserted into the slots of each mandrel. Once the first mandrel has been driven at least partially into the bat fabrication system and wrapping mechanisms and is engaged by the mandrel driving system, the second mandrel may be pulled through the bat fabrication system via its connection to the first mandrel.

Bat barrels are automatically formed over the second mandrel by wrapping mechanisms at step 1140. Automatically forming the bat barrels over the second mandrel is similar to automatically forming the bat barrels over the first mandrel discussed above with respect to 1120 and below with respect to the method of FIG. 12. The connected and wrapped mandrels are output from the bat fabrication system at step 1150. The connected mandrels will have one or more layers of wrapping and are connected together by the wrapping as well as the bushings between them. The connected mandrels may be separated at step 1160. In some embodiments, the mandrels are separated at the point of the bushing. The bushings may be split and the wrapping over the bushings may be cut to allow for the mandrels to be separated. As a result, the wrapping for each separated mandrel may cover the mandrel itself as well as a portion of the bushing which extends away from the mandrel.

Figure 12:
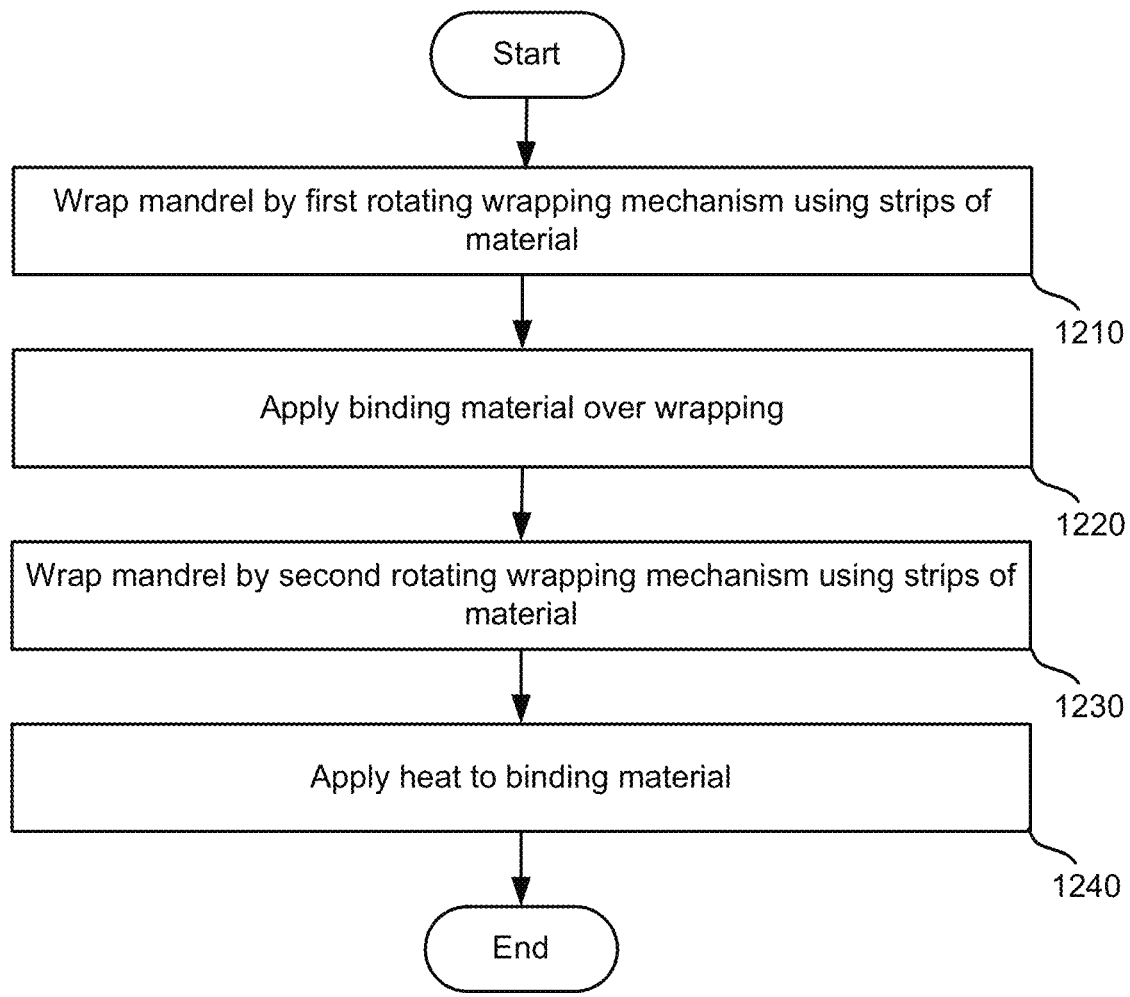
FIG. 12 illustrates an exemplary method for automatically forming bat barrels over a mandrel.

FIG. 12 illustrates an exemplary method for automatically forming bat barrels over a mandrel. The method of FIG. 12 provides more detail for step 1120 of the method of FIG. 11. A mandrel is wrapped by a first rotating wrapping mechanism which applies strips of material to the mandrel at step 1210. As the mandrel is moved forward through the bat fabrication machine and the wrapping mechanism rotates along a center axis formed by a mandrel tunnel, strips of wrapping material are applied over the outer surface of the mandrel.

A binding material is applied over the wrapping at step 1220. The binding material may include a fusible thread that will bind the next wrapping layer to the current outer wrapping layer of the mandrel. The mandrel is wrapped by a second rotating wrapping mechanism which applies strips of wrapping material to the mandrel at step 1230. Heat may then be applied to the binding material underneath the most recent wrapping layer at step 1240. When applying heat to the binding material such as fusible thread, the thread may fuse the wrapping layers which surround the fusible thread. The method of FIG. 12 may be repeated any number of times, in whole or in part, to apply as the desired layers of wrapping material to the mandrel.

Figure 13:
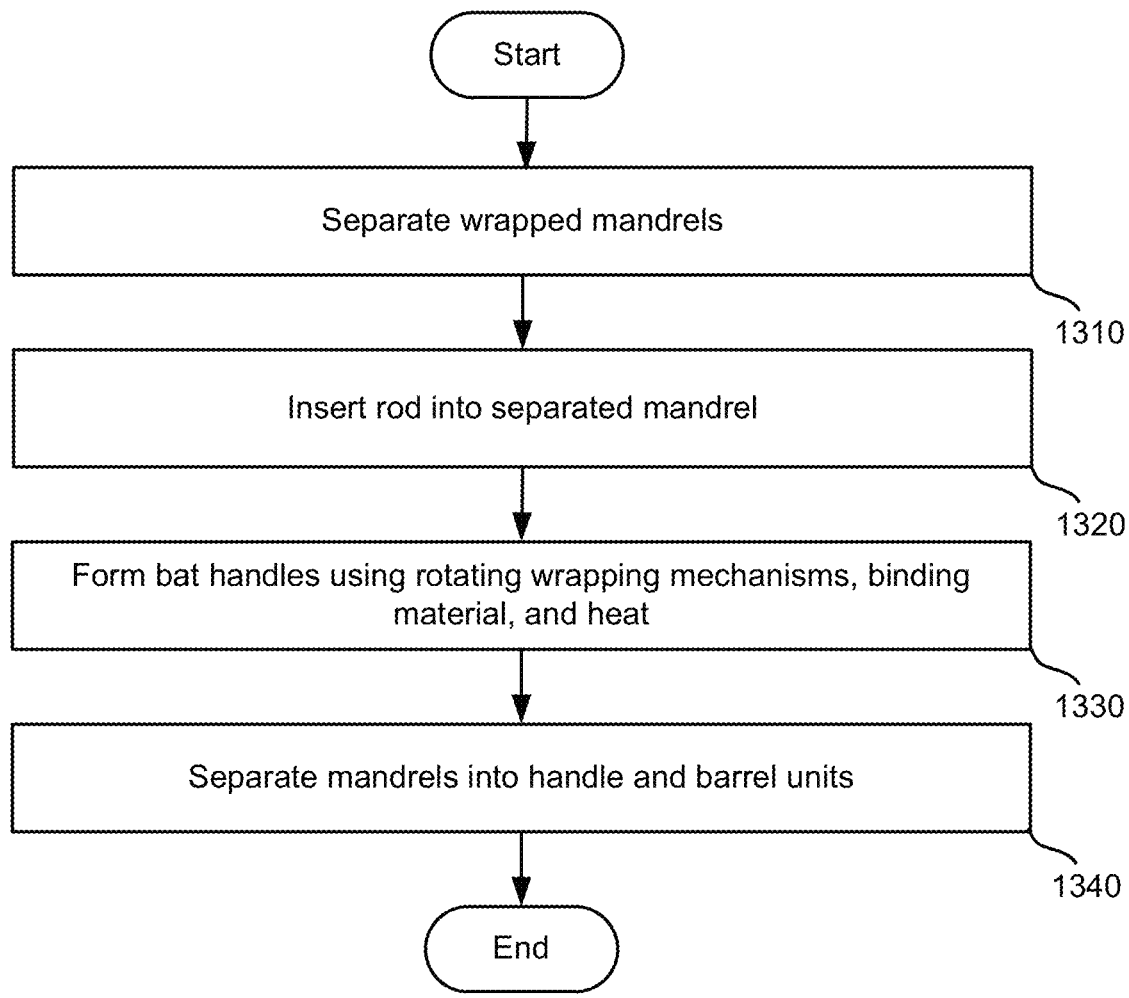
FIG. 13 illustrates an exemplary method for forming bat handles.

FIG. 13 illustrates an exemplary method for forming bat handles. The method of FIG. 13 provides more detail for step 1040 of the method of FIG. 10. The wrapped mandrels are separated at step 1310. Separating the wrapped mandrels may include severing the output of the mandrel driving system at each bushing position in the chain of mandrels. The bushings may be removed from the mandrels, and a rod may inserted into each end of the separated mandrels at step 1320. The rods may be inserted into the slots formed by the aluminum inserts within the mandrels. The rods may be uniform in shape or have a varying shape, based on the desired design of the bat.

Bat handles may then be formed using the rotating wrapping mechanisms, binding material and heat at step 1330. The mandrels having the inserted rods are fed into the series of wrapping mechanisms to provide additional wrapping to the wrapped mandrels and the rod extending from each mandrel. The mandrels may be connected together by attaching a coupling between rods of the mandrels. When connected together using a coupling, as a barrel end of a first mandrel is fed into the bat fabrication machine, the rod will be the last portion of the mandrel to be received. The rod of the first mandrel is connected to the rod of the next mandrel via the coupling. Additional mandrels may be connected in similar manner using additional rods and couplings.

The wrapped mandrels with adjoining wrapped rods are then separated into handle and barrel units at step 1340. The mandrels are disconnected from each other by separating the mandrels at the point of the coupling between the rods. The resulting individual wrapped mandrels and rods may then be cut in half at the center of the mandrel. The center of the mandrel corresponds to an outer edge of adjacent bat barrels. Hence, splitting the mandrel fabricationXXXes two individual bat barrel and handle units.

Figure 14:
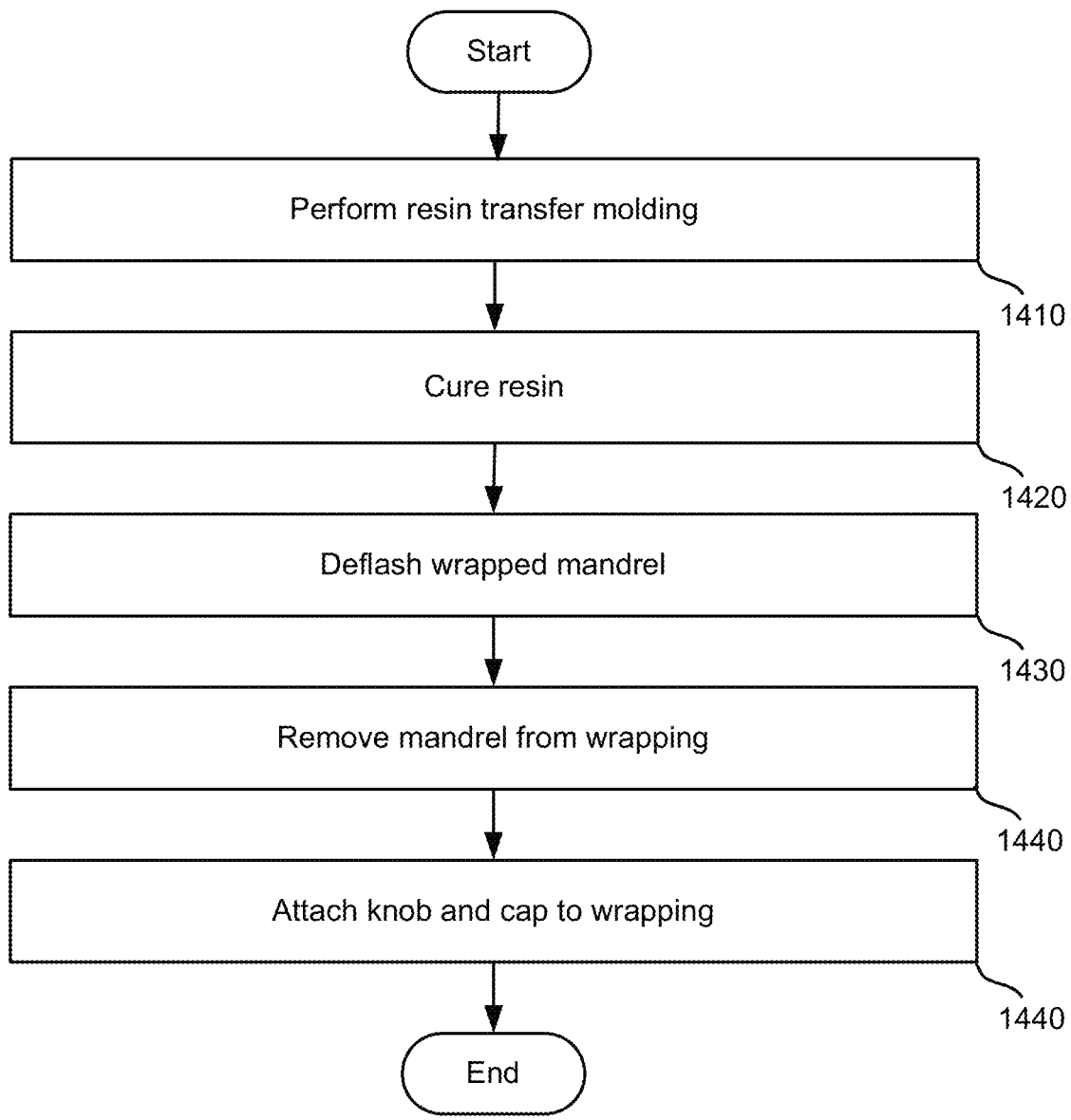
FIG. 14 illustrates a method for finalizing construction of a bat.

FIG. 14 illustrates a method for finalizing construction of a bat. The method of FIG. 14 provides more detail for step 1050 of the method of FIG. 10. A resin transfer molding is performed on the individual wrapped bat barrel and handle units at step 1410. The resin is then cured at step 1420. The resin of the RTM process may be cured at a temperature above room temperature to speed up the curing process but not hot enough to compromise the shape of the mandrel (e.g., melt a wax mandrel). After curing, the wrapped layers will be hardened. The wrapped mandrels are then de-flashed to smooth off any rough edges resulting from the RTM process. The mandrel portion is then removed from the cured resin wrapping at step 1440. The mandrel may be removed by melting the wax mandrel at a temperature which melts the wax but does not affect the cured resin of the wrapped layers. A cap may then be applied to the top of the bat and a knob applied to the bottom of the bat at step 1440 to complete construction of the bat.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:
1. A bat fabrication system, comprising:
a mandrel driving mechanism;

a plurality of rotating wrapping mechanisms that automatically wrap strips of material around a first mandrel driven by the mandrel driving mechanism;

a plurality of binding dispensers that automatically dispense a non-resin binding material over the wrapped strips, each binding dispenser disposed after one of the rotating wrapping mechanisms; and a plurality of heating members that automatically heat the binding material, each heating member coupled to the mandrel driving system after one of the binding dispensers.

2. The bat fabrication system of claim 1, wherein one of the plurality of heating members heats the binding material disposed between a first wrapping applied to the first mandrel by a first wrapping mechanism and a second wrapping applied to the first mandrel by a second wrapping mechanism.

3. The bat fabrication system of claim 1, wherein each rotating wrapping mechanism is aligned to allow the first mandrel to travel through a center axis about which each wrapping mechanism rotates.

4. The bat fabrication system of claim 3, wherein the mandrel travels through a mandrel tunnel located in each wrapping mechanism.

5. The bat fabrication system of claim 1, further including a wrapping mechanism driving system that drives one or more of the wrapping mechanisms.

6. The bat fabrication system of claim 1, wherein each wrapping mechanism includes a plurality of toes, each wrapping mechanism applying a wrapping around the first mandrel from each toe.

7. The bat fabrication system of claim 1, wherein the first mandrel is formed from wax.

8. The bat fabrication system of claim 1, wherein the first mandrel is connected to a second mandrel using a bushing.

9. The bat fabrication system of claim 1, wherein the bushing is configured to be severed in two pieces to separate the mandrels.

10. The bat fabrication system of claim 1, wherein the first mandrel is connected to a second mandrel through a pair of rods and a coupling.

11. The bat fabrication system of claim 1, wherein the binding material is fusible thread.

12. The bat fabrication system of claim 2, wherein the binding material is fusible thread.

* * * * *